United States Patent [19]

Inokuchi et al.

[11] Patent Number: 4,578,743
[45] Date of Patent: Mar. 25, 1986

[54] CONVERTER CONTROL SYSTEM HAVING STABLE POWER TRANSFER IN THE PRESENCE OF DECREASED INPUT AC VOLTAGE

[75] Inventors: Haruhisa Inokuchi; Takami Sakai, both of Tokyo, Japan

[73] Assignee: Kabushiki Kaisha Toshiba, Kawasaki, Japan

[21] Appl. No.: 622,877

[22] Filed: Jun. 21, 1984

[30] Foreign Application Priority Data

Jun. 21, 1983 [JP] Japan .................. 58-111383

[51] Int. Cl.⁴ .............................................. H01J 3/36
[52] U.S. Cl. .................................................... 363/35
[58] Field of Search ................. 363/35, 37, 51, 87, 363/88, 96

[56] References Cited

U.S. PATENT DOCUMENTS

| | | | |
|---|---|---|---|
| 4,320,444 | 3/1982 | Häusler et al. | 363/35 |
| 4,330,815 | 5/1982 | Konishi | 363/35 |
| 4,494,179 | 1/1985 | Inokuchi et al. | 363/35 |

FOREIGN PATENT DOCUMENTS 46-33255 9/1971 Japan .

OTHER PUBLICATIONS

Takenouchi et al, "Hokkaido-Honslu HVDC Link and Equipment for Hakodate Converter Station . . . ", *Hitachi Review*, vol. 28 (1979), No. 4, pp. 199–204.

Primary Examiner—Patrick R. Salce
Assistant Examiner—D. L. Rebsch
Attorney, Agent, or Firm—Oblon, Fisher, Spivak, McClelland & Maier

[57] ABSTRACT

A converter control system for DC power transmission line performs the following operation. When the DC current flowing through an inverter decreases to a value being smaller than a rated current value by a value in excess of a predetermined value, a reference voltage value determining the DC voltage of the inverter decreases. The decrease of this reference voltage value is limited to a given extent, so that a partial constant current characteristic portion appears at the voltage decreased portion in the DC voltage/current characteristic of the inverter. Then, an automatic voltage regulator of the inverter is rendered always active.

8 Claims, 9 Drawing Figures

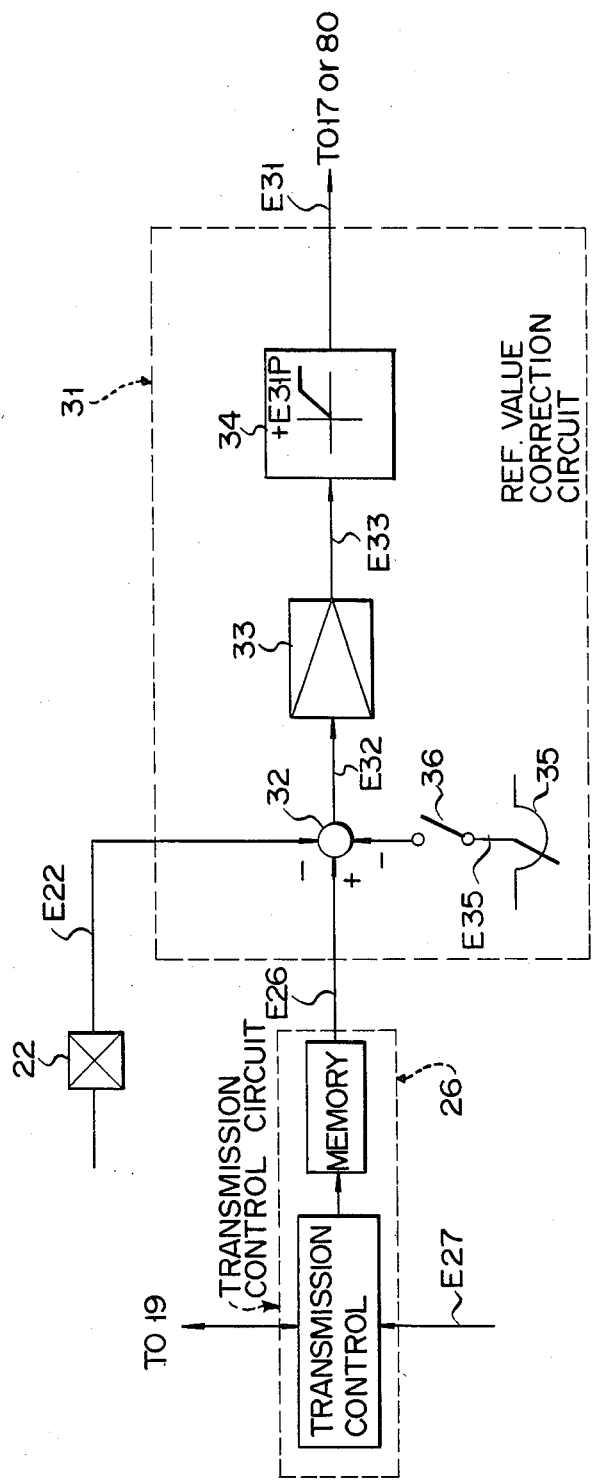
F I G. 5

CONVERTER CONTROL SYSTEM HAVING STABLE POWER TRANSFER IN THE PRESENCE OF DECREASED INPUT AC VOLTAGE

BACKGROUND OF THE INVENTION

The present invention relates to a control system for converters (inverter/rectifier) of a DC power transmission line.

FIG. 1 shows a prior art converter control system for a DC power transmission line. Such a control system is generally known from the following publication:

International Conference on Large High Voltage Electric Systems
1980 session (August 27–September 4) tilted: "HOKKAIDO-HONSHU HVDC LINK" by T. Takenouch et al. (Japan)

Details of each element shown in FIG. 1 are known to a skilled person in the art. In FIG. 1, the DC circuit of a converter 1A is coupled via a DC reactor 2A, DC power transmission lines 3 and a DC reactor 2B to the DC circuit of a converter 1B. The AC circuit of converter 1A is coupled via a converter transformer 4A and a circuit breaker 5A to a 3-phase AC power line 6A, and the AC circuit of converter 1B is coupled via a converter transformer 4B and a circuit breaker 5B to a 3-phase AC power line 6B. Converter 1A is associated with an automatic voltage regulator 11A, an automatic extinction angle regulator 12A and an automatic current regulator 13A. Converter 1B is associated with an automatic voltage regulator 11B, an automatic extinction angle regulator 12B and an automatic current regulator 13B. Automatic extinction angle regulator 12A is provided for a prescribed operation that the extinction angle of converter 1A traces or follows a reference extinction angle value E18A obtained from a extinction angle presetter 18A, and automatic extinction angle regulator 12B is provided for a prescribed operation that the extinction angle of converter 1B follows a reference extinction angle value E18B obtained from an extinction angle presetter 18B.

The value of a detected DC voltage obtained from a DC voltage detector 15A is properly changed via a voltage/voltage converter 16A to a value being well adapted to the control circuitry of FIG. 1. The changed value obtained from voltage/voltage converter 16A is used as a DC voltage detected value E16A. DC voltage detected value E16A is subtracted in a summing circuit 17A from a reference voltage value E14A obtained from a DC voltage presetter 14A. Summing circuit 17A supplies to automatic voltage regulator 11A the difference between DC voltage detected value E16A and reference voltage value E14A, so that the DC voltage of DC power transmission line 3 at converter 1A side follows the reference voltage value E14A from DC voltage presetter 14A.

The value of a detected DC voltage obtained from a DC voltage detector 15B is properly changed via a voltage/voltage converter 16B to a value being well adapted to the control circuitry of FIG. 1. The changed value obtained from voltage/voltage converter 16B is used as a DC voltage detected value E16B. DC voltage detected value E16B is subtracted in a summing circuit 17B from a reference voltage value E14B obtained from a DC voltage presetter 14B. Summing circuit 17B supplies to automatic voltage regulator 11B the difference between DC voltage detected value E16B and reference voltage value E14B, so that the DC voltage of DC power transmission line 3 at converter 1B side follows the reference voltage value E14B from DC voltage presetter 14B.

The detected DC current value obtained from a DC current detector 21A is converted via a current/voltage converter 22A to a value being well adapted to the control circuitry. The converted value obtained from current/voltage converter 22A is used as a DC current detected value E22A. DC current detected value E22A is subtracted in a summing circuit 23A from a reference current value E26A obtained from a transmission control circuit 26A. Summing circuit 23A supplies to automatic current regulator 13A the difference between DC current detected value E22A and reference current value E26A, so that the DC current of DC power transmission line 3 at converter 1A side follows the reference current value E26A from transmission control circuit 26A.

The detected DC current value obtained from a DC current detector 21B is converted via a current/voltage converter 22B to a value being well adapted to the control circuitry. The converted value obtained from current/voltage converter 22B is used as a DC current detected value E22B. DC current detected value E22B is subtracted in a summing circuit 23B from a reference current value E26B obtained from a transmission control circuit 26B. Summing circuit 23B supplies to automatic current regulator 13B the difference between DC current detected value E22B and reference current value E26B, so that the DC current of DC power transmission line 3 at converter 1B side follows the reference current value E26B from transmission control circuit 26B.

A current margin value E25A or E25B obtained from a current margin presetter 25A or 25B is supplied via the closed one of switches 24A and 24B to the corresponding summing circuit 23A or 23B. Of switches 24A and 24B, only the one which allows the corresponding converter to operate as an inverter is closed. An advanced control angle preference circuit 28A receives outputs from regulators 11A, 12A and 13A. Advanced control angle preference circuit 28A selects only one of the received outputs in a manner that the selected one has the most phase-advanced control angle. An advanced control angle preference circuit 28B receives outputs from regulators 11B, 12B and 13B, and selects only one having the most phase-advanced control angle.

It is now assumed that switch 24B is closed while switch 24A is opened. In this case, according to the function of said current margin value and to the selecting function of advanced control angle preference circuits 28A and 28B, circuit 28A selects the output from automatic current regulator 13A and circuit 28B selects one having the most phase-advanced control angle of outputs from automatic voltage regulator 11B and automatic extinction angle regulator 12B. Circuit 28B generally selects the output from automatic voltage regulator 11B.

The selected output from circuit 28A is supplied to a phase control circuit 29A in which the selected output is converted into pulse signals which determine the triggering timing of the corresponding converter 1A. The selected output from circuit 28B is supplied to a phase control circuit 29B in which the selected output is converted into pulse signals which determine the triggering timing of the corresponding converter 1B. The pulse signals from phase control circuit 29A are supplied as gate pulses to converter 1A via a pulse amplifier 30A. The pulse signals from phase control circuit 29B are supplied as gate pulses to converter 1B via a pulse amplifier 30B.

It is conventional to arrange a converter control system in the manner described above. It is also known from, e.g., Japanese Patent Publication (Kokoku) No. 46-33255 that a typical operation characteristic curve of DC power transmission utilized in such a converter control system becomes as shown in FIG. 2. In FIG. 2, a DC current Id is plotted along the axis of abscissa and a DC voltage Ed is plotted along the axis of ordinate. Since it has been assumed that switch 24A is opened and switch 24B is closed, converter 1A serves as a rectifier (forward converter) while converter 1B serves as an inverter (reverse converter). The following description will be made under this assumption.

A curve having portions (a), (b) and (c) in FIG. 2 represents the characteristic of converter 1A which operates as a rectifier. A curve having portions (d), (e), (f) and (g) shows the characteristic of converter 1B which operates as an inverter. The intersecting point of the curve of (a) to (c) and the curve of (d) to (g) defines the operational point of the DC power transmission line. Of portions (a), (b) and (c), portions (a) and (b) represent the regulation curve which depends mainly on the commutating impedance of converter 1A. Portions (b) and (c) represents a constant current characteristic curve obtained by the actuation of automatic current regulator 13A. Of portions (d), (e), (f) and (g), portions (d) and (e) represents a constant current characteristic curve obtained by the actuation of automatic current regulator 13B. Portions (e) and (f) represents a constant voltage characteristic curve obtained by the actuation of automatic voltage regulator 11B. Portions (f) and (g) represents a constant extinction angle characteristic obtained by the actuation of automatic extinction angle regulator 12B. The difference between a DC current IdA given by portions (b, c) and a DC current IdB given by portions (d, e) corresponds to the current margin which is generally set to be 5% to 10% of the rated DC current (IdA). For instance, if the rated current IdA is set at 10.0 A, the DC current IdB is 9.0 A to 9.5 A.

The reason why the current margin is set at 5% to 10% of the rated DC current will now be described.

It is assumed that the current margin is set at a very large value so that no constant current characteristic appears at converter 1B (i.e., IdB=0). In this case, the operation characteristic curve of converter 1B may be represented by portions (h), (f) and (g) in FIG. 3. Referring to FIG. 3, portions (h) and (f) represent the constant voltage characteristic obtained by the actuation of automatic voltage regulator 11B. Portions (f) and (g) represent the constant extinction angle characteristic obtained by the actuation of automatic extinction angle regulator 12B. Meanwhile, the operation characteristic curve of converter 1A is not changed from the case of FIG. 2, as indicated by portions (a), (b) and (c) in FIG. 3.

An intersecting point (A) of the two operation characteristic curves defines the operation point of the DC power transmission line. When the AC voltage of AC power line 6A coupled to converter 1A decreases under the above assumption, the regulation curve is shifted from portions (a) and (b) to portions (a') and (b') as indicated by the broken line in FIG. 3. Then, the operation characteristic curve of converter 1A becomes one being represented by the portions (a'), (b') and (c) in FIG. 3. From this, the operation point of the DC power transmission line is shifted from point (A) to a point (A') of FIG. 3. In this case, only a little DC current can flow and the power transfer from AC line 6A to AC line 6B is substantially disenabled. This is a serious problem.

In order to solve the above problem, the current margin is generally set at 5% to 10% of the rated current (IdA). When the current margin is set to fall within the range of 5% to 10%, the operation characteristic curve of converter 1B becomes one being represented by portions (d), (e), (f) and (g) in FIG. 2. Thus, even when the AC voltage of AC line 6A decreases and the operation characteristic curve of converter 1A is shifted from the portions (a), (b) and (c) to the portions (a'), (b') and (c) as indicated by the broken line in FIG. 2, the operation point of DC power transmission line is changed only from point (A) to a point (A') of FIG. 2. Thus, power transfer from AC line 6A to AC line 6B can be performed with only 5% to 10% decrease in the DC current. In this manner, to achieve a stable power transfer with a decreased voltage in the AC line of a forward converter (rectifier), in a prior art control system, a reverse converter (inverter) must always have a constant current characteristic with a current margin of about 5% to 10% with respect to the constant current (IdA) of the forward converter.

When the above prior art control system is applied to a DC power transmission line, a known technique which will be described below is applied to the transmission control circuits 26A and 26B in FIG. 1.

A DC power transmission line is generally provided with a control circuit for controlling the amount of power transfer between AC line 6A and AC line 6B. This control circuit produces a reference current value which corresponds to a current flowing through the power transmission line. The reference current value is supplied to the forward and reverse converters. For the sake of simplicity, the circuit for controlling the power transfer is called a reference current output circuit 27. An output signal E27 from reference current output circuit 27 is constantly supplied to transmission control circuit 26A and supplied, via a transmission line 19 of a communication system such as a microwave communication line, to transmission control circuit 26B.

As has been described before, when the currents at constant current characteristic portions of the forward and reverse converters are compared, the constant current characteristic portion (IdB in FIG. 2) of the reverse converter (inverter) is set to be smaller than that (IdA in FIG. 2) of the forward converter (rectifier) by a value corresponding to current margin value E25A or E25B. More specifically, the current margin value E25A or E25B is supplied to summing circuit 23A or 23B by proper selection of switches 24A and 24B, and the converter responsive to the selected current margin value operates as a reverse converter. Namely, when switch 24B is closed while switch 24A is opened and if reference current value E26A of converter 1A is equal to reference current value E26B of converter 1B, converter 1B operates as a reverse converter and has an operation characteristic curve of portions (d) to (g) as shown in FIG. 2. This characteristic curve is obtained by the function of the current margin and by the function of advanced control angle preference circuits 28A and 28B.

It is assumed that, for some reason, reference current value E26B of converter 1B becomes larger, by a value in excess of current margin E25B, than reference current value E26A of converter 1A. In this case, current IdB of the constant current characteristic portion of converter 1B becomes higher than current IdA of the constant current characteristic portion of converter 1A. This situation is equivalent to a state wherein, if reference current value E26B of converter 1B is apparently equal to reference current value E26A of converter 1A, the difference between current IdB and current IdA is supplied to converter 1A as a signal corresponding to the current margin. This means that the control mode is changed from one in which converter 1A operates as a forward converter while converter 1B operates as a reverse converter to one in which converter 1A operates as a reverse converter while converter 1B operates as a forward converter. Such a control mode change is called "power reversal". When a power reversal occurs, the power transfer from AC line 6A to AC line 6B is stopped, but that from AC line 6B to AC line 6A is carried out. This is a serious problem of the prior art converter control system.

In the above description, it was assumed that switch 24B of converter 1B is closed and that the reference current value E26B of converter 1B operating as a reverse converter would become larger than that E26A of converter 1A for some reason. One example of such a situation will be described below.

Now consideration will be given to a case where an output signal E27 from reference current output circuit 27 decreases. In this case, it is assumed that transmission control circuits 26A and 26B merely have a function to transfer or exchange given signals through microwave communication line 19. Under this assumption, reference current value E26A from transmission control circuit 26A is decreased with a decrease in output signal E27 from reference current output circuit 27 without substantial time delay, but reference current value E26B from transmission control circuit 26B is decreased with a certain time delay due to the presence of transmission line 19 of the communication system. In this case, regardless of the fact that normal signals are constantly transmitted via transmission line 19, reference current value E26B of converter 1B could temporarily become larger than reference current value E26A of converter 1A due to the above signal transmission time delay. This causes the problem of said power reversal.

In a prior art converter control system, in order to solve the above power reversal problem, transmission control circuits 26A and 26B must have not only the signal transfer function as described above but also have the following function. That is, when output signal E27 from reference current output circuit 27 decreases, the reference current value of a converter to be operated as a reverse converter is decreased first and then the reference current value of a converter to be operated as a forward converter is decreased. Conversely, when output signal E27 from reference current output circuit 27 increases, the reference current value of a converter to be operated as a forward converter is increased first and then the reference current value of a converter to be operated as a reverse converter is increased. Thus, transmission control circuits 26A and 26B transfer or exchange their given signals in a manner that the reference current value of a converter to be operated as a forward converter is always kept larger than that of a converter to be operated as a reverse converter. In other words, transmission control circuits 26A and 26B of the prior art system serve to transfer their signals so that a necessary current margin is always retained regardless of the increase or decrease of output signal E27 from reference current output circuit 27.

To solve the problem caused by a decrease in the AC line voltage at the forward converter (which has been already discussed with reference to FIG. 3), the reverse converter should have a specific constant current characteristic whose constant current value is determined by subtracting the current margin of 5% to 10% from the constant current value of the forward converter. For this purpose, the current margin value must be maintained at a certain value. However, when the communication system fails to operate normally due to disturbance etc., or when communication via the microwave communication line is interrupted, the reference current value determining the amount of power transfer cannot be properly changed. This would cause a disadvantageous situation that, even if output signal E27 from reference current output circuit 27 changes, transmission line 19 of the communication system cannot transmit the corresponding signal change properly. In other words, the reference current value of a converter to be operated as a reverse converter could become larger than that of a converter to be operated as a forward converter, resulting in the occurrance of said power reversal.

SUMMARY OF THE INVENTION

It is accordingly an object of the present invention to provide a converter control system for a DC power transmission line, which system avoids a power reversal problem and is capable of stable power transfer without need for incorporating a constant current margin maintaining means.

To achieve the above object, a control system for converters of the invention performs a specific operation in which, when the DC current of a converter operating as a reverse converter is decreased to a value being smaller than a rated current value by a value in excess of a predetermined value, a reference voltage value which determines the DC voltage of the reverse converter is decreased, and the decreased voltage value is limited to a certain extent. Then, a partial constant current characteristic portion appears at the voltage decreased portion in the voltage/current characteristic of the reverse converter, and an automatic voltage regulator of the reverse converter is rendered always active, thereby allowing stable power transfer.

BRIEF DESCRIPTION OF THE DRAWINGS

FIG. 5 shows details of a reference value correction circuit (31A or 31B) shown in FIG. 4;

DETAILED DESCRIPTION OF THE PREFERRED EMBODIMENT

Figure 2:
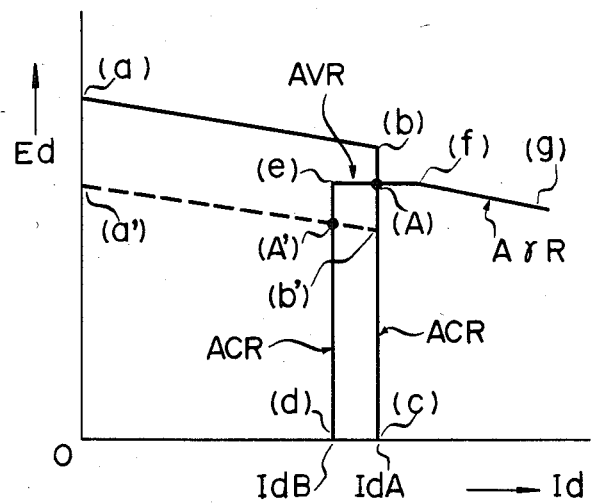
FIGS. 2 and 3 shown operation characteristic curves of a prior art DC power transmission line, which are used for explaining the operation of the control system of FIG. 1.
Figure 3:
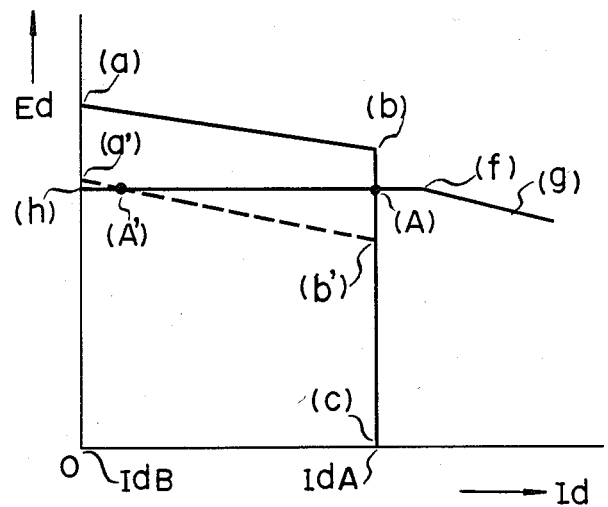
Figure 4:
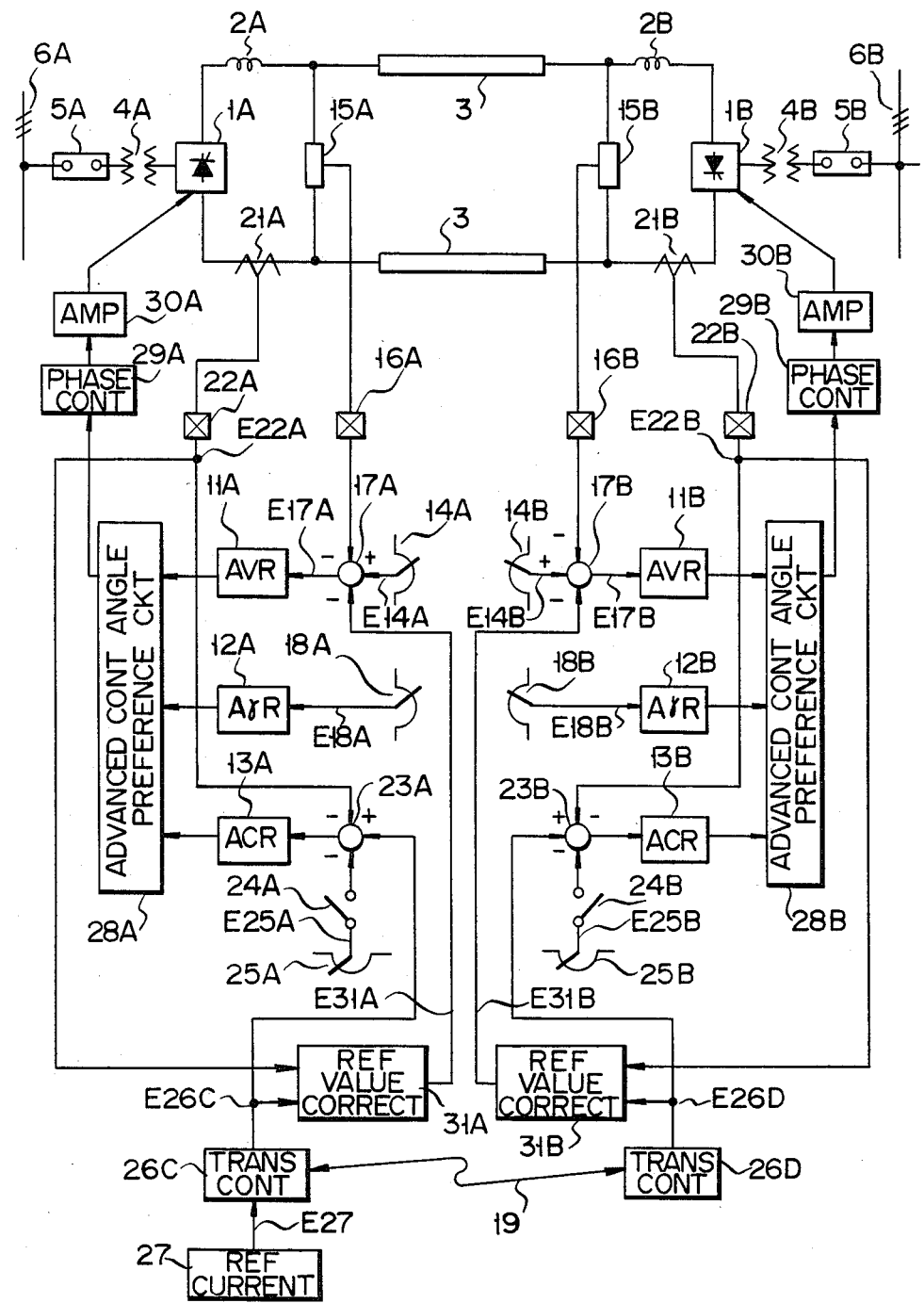
FIG. 4 is a schematic block diagram showing an embodiment of converter control system according to the present invention.

FIG. 4 shows a schematic block diagram of a converter control system according to an embodiment of the present invention. The key feature of the present invention resides mainly in the configuration of a reference value correction circuit (31A, 31B). Among all figures, the common reference numerals denote the common elements having substantially the same functions, and details of the elements having already been described with reference to FIGS. 1 to 3 will be omitted hereinafter.

Figure 1:
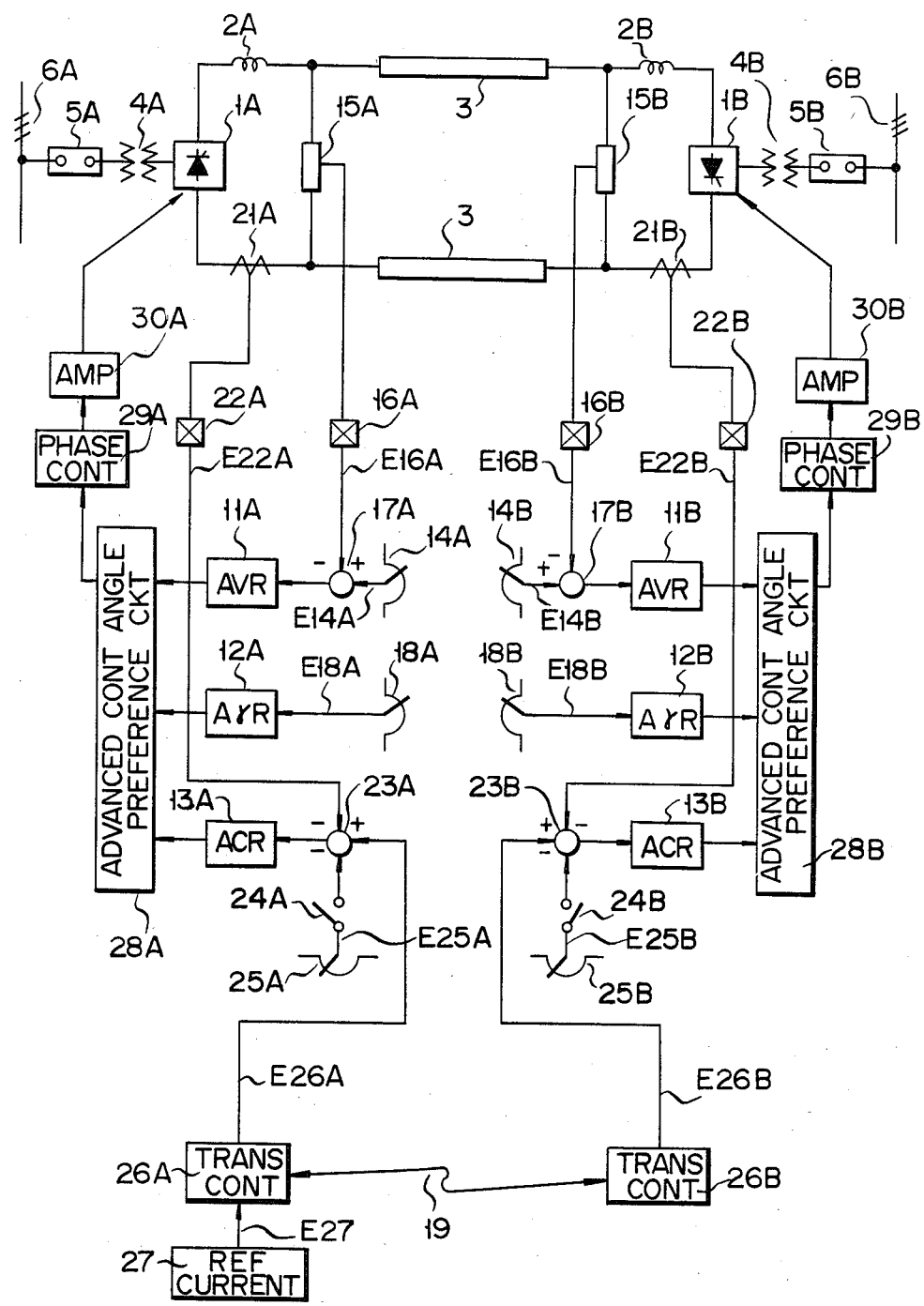
FIG. 1 is a schematic block diagram of a prior art converter control system.

Reference value correction circuits 31A and 31B respectively receive reference current values E26C and E26D outputted from transmission control circuits 26C and 26D. Circuits 26C and 26D may not be necessarily provided with a function for rendering the current margin constant, unlike the aforementioned prior art transmission control circuits 26A and 26B (FIG. 1). Reference value correction circuits 31A and 31B also receive DC current detected values E22A and E22B from current/voltage converters 22A and 22B. Descriptions regarding the reference current values E26C and E26D and those regarding the DC current detected values E22A and E22B will be described later. Reference correction values E31A and E31B obtained from reference value correction circuits 31A and 31B are respectively supplied to summing circuits 17A and 17B. Reference voltage values E14A and E14B obtained from DC voltage presetters 14A and 14B are respectively decreased by reference correction values E31A and E31B in summing circuits 17A and 17B.

The function of reference value correction circuits 31A and 31B will now be described with reference to FIGS. 5 to 7. FIG. 5 shows details of each of reference value correction circuits 31A and 31B shown in FIG. 4. For the sake of simplicity, no suffixes (A, B) are attached to the reference symbols.

In FIG. 5, a summing circuit 32 in reference value correction circuit 31 receives a reference current value E26 from transmission control circuit 26, a DC current detected value E22 from current/voltage converter 22, and a predetermined bias value E35 being set by a bias presetter 35. Predetermined bias value E35 is supplied to summing circuit 32 via a switch 36. Switch 36 is closed when the corresponding converter is to be operated as a reverse converter. When switch 36 is closed, summing circuit 32 subtracts DC current detected value E22 and bias value E35 from reference current value E26 and supplies a signal E32 representing the result of the subtraction to an amplifier 33. Amplifier 33 amplifies the inputted signal E32 and supplies an amplified signal E33 to a limiter 34. Amplifier 33 serves to produce a positive signal +E33 when signal E32 is positive and serves to produce a negative signal −E33 when signal E32 is negative. Meanwhile, limiter 34 has a function of limiting the potential of its output which is used as reference correction value E31, so that output E31 does not become negative when signal E33 is negative and so that output E31 will not exceed a predetermined value (+E31P) when signal E33 is positive.

Figure 6:
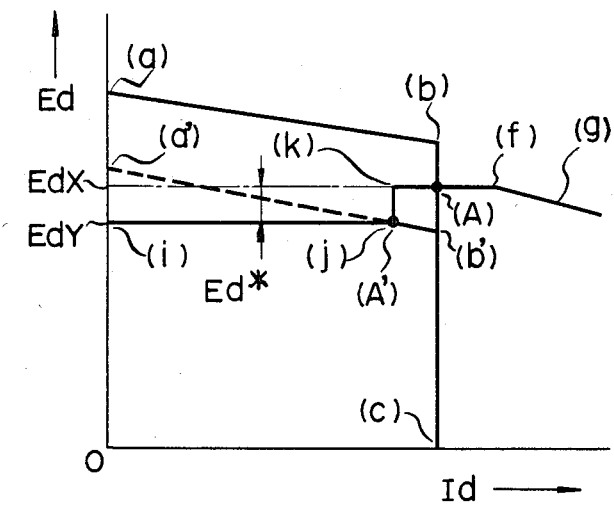
FIGS. 6 and 7 show the operation characteristic curves, which are used for explaining the operation of the control system of FIG. 4.

The control system having the above configuration will operate according to the characteristic curve as shown in FIG. 6. This will be described below.

As in the description given before, it is again assumed, in FIG. 4, that switch 24A is opened while switch 24B is closed. Converter 1A then operates as a forward converter (rectifier) and has an operation characteristic curve as defined by portions (a), (b) and (c) in FIG. 6. This characteristic curve is the same as that shown in FIG. 2. Meanwhile, since switch 24B is closed, current margin value E25B from current margin presetter 25B is supplied to summing circuit 23B. As has been described earlier when explaining why a current margin of 5% to 10% is required, if current margin presetter 25B sets an excessively large current margin value so that the constant current characteristic portion of the reverse converter disappears, converter 1B has an operation characteristic curve being defined by portions (h), (f) and (g) as shown in FIG. 3.

The operation of reference value correction circuit 31B for converter 1B will now be described with reference to FIGS. 4 and 5, wherein switch 36 (FIG. 5) of reference value correction circuit 31B (FIG. 4) is closed. Assume that bias value E35 (FIG. 5) is set by bias presetter 35 to be 5% to 10% of the rated DC current value, as in the case for the current margin of a prior art converter control system (FIG. 1). As shown in FIG. 5, reference current value E26 (E26D in FIG. 4) from transmission control circuit 26 and DC current detected value E22 (E22B in FIG. 4) from current/voltage converter 22 are inputted to summing circuit 32 of reference value correction circuit 31 (31B in FIG. 4). The former reference current value (E26) is normally equal to the latter DC current detected value (E22). For this reason, amplifier 33 (FIG. 5) receives signal E32 having a negative potential corresponding to bias value E35. Therefore, output E33 from amplifier 33 becomes negative. The value of this negative output E33 is limited to zero by limiter 34, and the limited output E31 (=0) is then supplied to summing circuit 17 (17B in FIG. 4). Then, converter 1B (FIG. 4) operates under a constant voltage control according to reference voltage value E14B from DC voltage presetter 14B. In this case, a constant voltage EdX (FIG. 6) corresponding to reference voltage value E14B is obtained at the DC circuit of converter 1B.

Now assume that DC current detected value E22 becomes smaller than reference current value E26 and further becomes smaller than bias value E35 so that signal E32 inputted to amplifier 33 becomes positive. Then, amplifier 33 supplies positive signal E33 to limiter 34. Limiter 34 limits its positive output to a predetermined value +E31P and provides a limited reference correction value E31P (E31 in FIG. 4) to summing circuit 17B (FIG. 4). Summing circuit 17B provides a reference voltage value E17B which is smaller than reference voltage value E14B by limited reference correction value E31P. Reference voltage value E17B is supplied to automatic voltage regulator 11B. Then, the DC voltage at converter 1B side is decreased according to limited reference correction value E31P.

As described above, when DC current detected value E22B is decreased below a value which is smaller by bias value E35 than reference current value E26D, the potential of reference correction value E31 becomes positive and reference value correction circuit 31B serves to decrease the reference voltage value E17B. The partial constant current characteristic of portions (k) and (j) in FIG. 6 is thus obtained. (Incidentally, the actual inclination of the characteristic curve of portions (k) and (j) can be changed by changing the gain of amplifier 33.) When DC current detected value E22B tends to decrease further, limiter 34B limits the corresponding increase of reference correction value E31. In this case, converter 1B is operated at a constant voltage EdY (FIG. 6) which is lower by a value Ed* than DC voltage EdX corresponding to reference voltage value E14B. Value Ed* is defined according to a value (E14B−E31P) which is obtained by subtracting the limited reference correction value E31P from the reference voltage value E14B. Constant voltage characteristic of portions (j) and (i) in FIG. 6 is thus obtained.

As is understood from the above description, the operation characteristic curve of converter 1B becomes one having portions (i), (j), (k), (f) and (g) as shown in FIG. 6. According to the present embodiment, the DC power transmission line operates at point (A). Point (A) is defined by the intersection of the operation characteristic curves having portions (a), (b) and (c) of converter 1A (forward converter) and that having portions (i), (j), (k), (f) and (g) of converter 1B (reverse converter). Thus, the operation point of the DC power transmission line according to the present embodiment remains the same as point (A) in FIG. 2.

As was considered in the description of the prior art converter control system, also considered here is a situation wherein the AC voltage of AC line 6A of converter 1A is decreased. As has been described before, when the AC voltage is decreased, the operation characteristic curve of converter 1A is shifted from one having portions (a), (b) and (c) to one having portions (a'), (b') and (c), as indicated by the broken line in FIG. 6. In this case, stable power transfer by the DC power transmission line is effected at point (A').

The mode of operation wherein the communication system fails to normally operate due to disturbance etc., will now be described with reference to FIG. 7. The operation characteristic curve of converter 1A (forward converter) is assumed to be one having portions (a), (b) and (c) as shown in FIG. 7, while the operation characteristic curve of converter 1B (reverse converter) is assumed to be one having portions (i), (j), (k), (f) and (g). The operating point of the DC power transmission line is given by a point (B). Point (B) is obtained at the intersection of portions (b, c) and portions (k, f) in FIG. 7.

As has been described, transmission control circuits 26A and 26B of the prior art control system must have a function for maintaining a constant current margin. However, in the control system of the present invention, such a maintaining function need not be incorporated. It is sufficient to the present invention that an output signal E27 from reference current output circuit 27 is properly transmitted, received and memorized. As was described with reference to transmission control circuits 26A and 26B in FIG. 1, in order to constantly maintain a certain current margin, reference current values E26A and E26B are generally memorized in transmission control circuits 26A and 26B when reference current values E26A and E26B are supplied to summing circuits 23A and 23B. For the sake of simplicity, it is also assumed in the present invention that reference current values E26C and E26D are memorized in transmission control circuits 26C and 26D (cf. 26 in FIG. 5).

Figure 7:
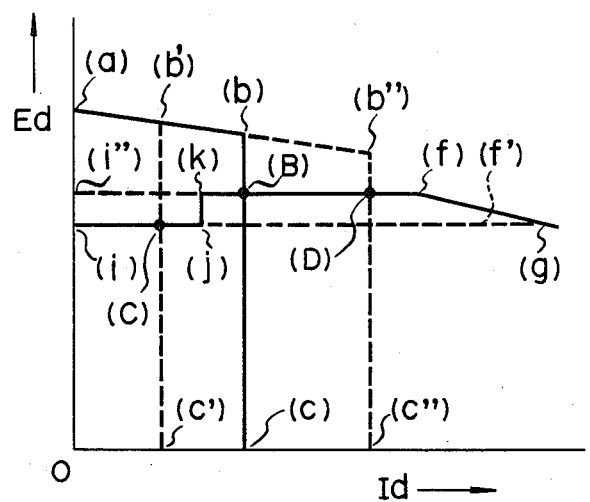

Under the above assumption, immediately before the communication system fails, transmission control circuits 26C and 26D respectively memorize the reference current values corresponding to the DC current at portions (b) and (c) in FIG. 7.

When output E27 from reference current output circuit 27 decreases, reference current value E26C of converter 1A also decreases. Then, the operation characteristic curve of converter 1A is shifted from one having portions (a), (b) and (c) to one having portions (a), (b') and (c') as indicated by the broken line in FIG. 7. At converter 1B, when DC current detected value E22B becomes smaller than the memorized reference current value E26D by a value in excess of bias value E35, reference value correction circuit 31B serves to decrease the DC voltage of converter 1B. However, since the decreased amount of reference voltage value E17B is limited to a certain extent according to the limiting operation of limiter 34, the operation characteristic curve of converter 1B becomes one having portions (i), (j), (k), (f) and (g) which is the same as that obtained before failure of the communication system. Thus, an operating point (C) which is defined at the intersection of portions (b'), (c') and portions (i), (j) in FIG. 7 is obtained.

A case wherein output E27 from reference current output circuit 27 is increased will now be described. In this case, the operation characteristic curve of converter 1A is shifted from one having portions (a), (b) and (c) to one having portions (a), (b") and (c"), but the operation characteristic curve of converter 1B is not changed from one having portions (i), (j), (k), (f) and (g). This operation characteristic curve of portions (i) to (g) is the same as that obtained before the failure of the communication system. Thus, the operating point of the DC power transmission line in this case is given by a point (D) which is defined at the intersection of portions (b"), (c") and portions (k), (f) in FIG. 7.

As has been described, when the prior art communication system using transmission line 19 fails, the power transfer amount between converters 1A and 1B is unsuitably fixed. However, disadvantages due to such an unsuitable fixation can be removed by the present invention. Thus, as may be seen from FIG. 7, according to the control system of the present invention, stable operating points (B, C, D) can be obtained with a change in output E27 from reference current output circuit 27.

In the above description, for the sake of simplicity, it has been assumed that each of transmission control circuits 26C and 26D is provided with a means for memorizing the reference current values E26C and E26D. If transmission control circuits 26C and 26D are not provided with such a means, reference current value E26D of converter 1B disappears when the communication system of transmission line 19 fails. When such failure occurs, the operation characteristic curve of converter 1B becomes one having portions (i"), (k), (f) and (g) as shown in FIG. 7, which is the same as that having portions (h), (f) and (g) in FIG. 3. Thus, even if the above-mentioned memorizing means is not provided, unless the AC voltage at the forward converter side decreases substantially, stable power transfer can be achieved.

When the control system of the invention is further provided with a means for detecting a failure of the communication system and also with a means for setting the reference current value of a reverse converter to be larger than the rated DC current, the resultant operation characteristic curve becomes one having portions (i), (j), (f') and (g) as shown in FIG. 7. In this case, as may be seen from the operation characteristic curve of FIG. 7, stable power transfer can be performed, provided that decrease in the AC voltage of the forward converter is not so large.

In the above description, reference correction values E31A and E31B from reference value correction circuits 31A and 31B are respectively supplied to summing circuits 17A and 17B so as to decrease reference voltage values E17A and E17B of automatic voltage regulators 11A and 11B. In addition, the decreased amount of each of reference voltage values E17A and E17B is limited to a predetermined value according to the operation of limiter 34 shown in FIG. 5.

Figure 8:
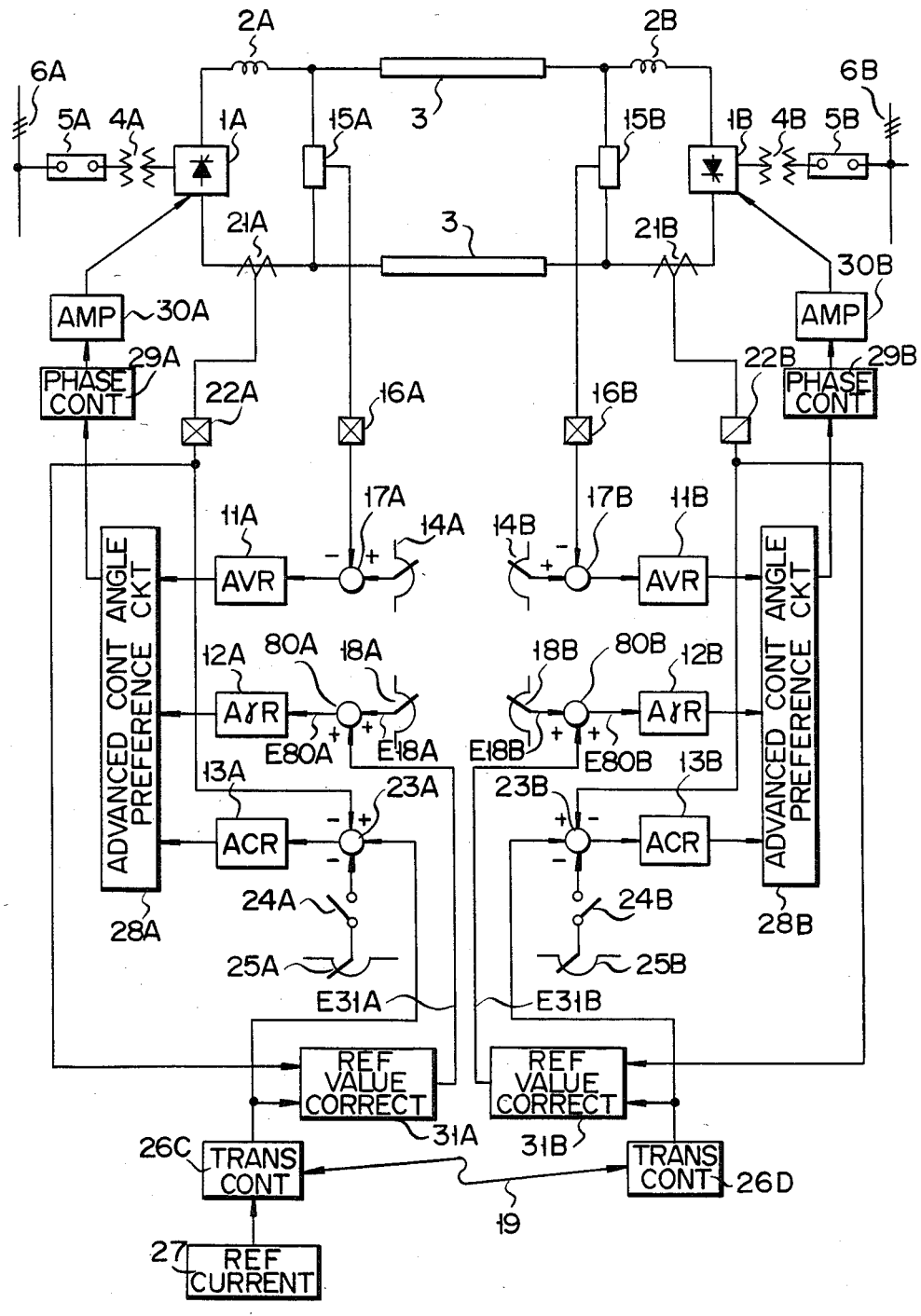
FIG. 8 shows a modification of the embodiment of FIG. 4.

On the other hand, as shown in an embodiment of FIG. 8, reference correction values E31A and E31B from reference value correction circuits 31A and 31B may be respectively added in summing circuits 80A and 80B to reference extinction angle values E18A and E18B from extinction angle presetters 18A and 18B. Summing circuits 80A and 80B supply the added results E80A and E80B to automatic extinction angle regulators 12A and 12B, respectively. When added results E80A and E80B are increased by reference correction values E31A and E31B, the extinction angle values of converters 1A and 1B are also increased. Then, the DC voltages of converters 1A and 1B are decreased. In this case, similar operations as that described with reference to the embodiment of FIG. 4 can be obtained.

When the control system is designed to increase the reference extinction angle values as described above, automatic voltage regulators 11A and 11B can be omitted, as the case may be.

Figure 9:
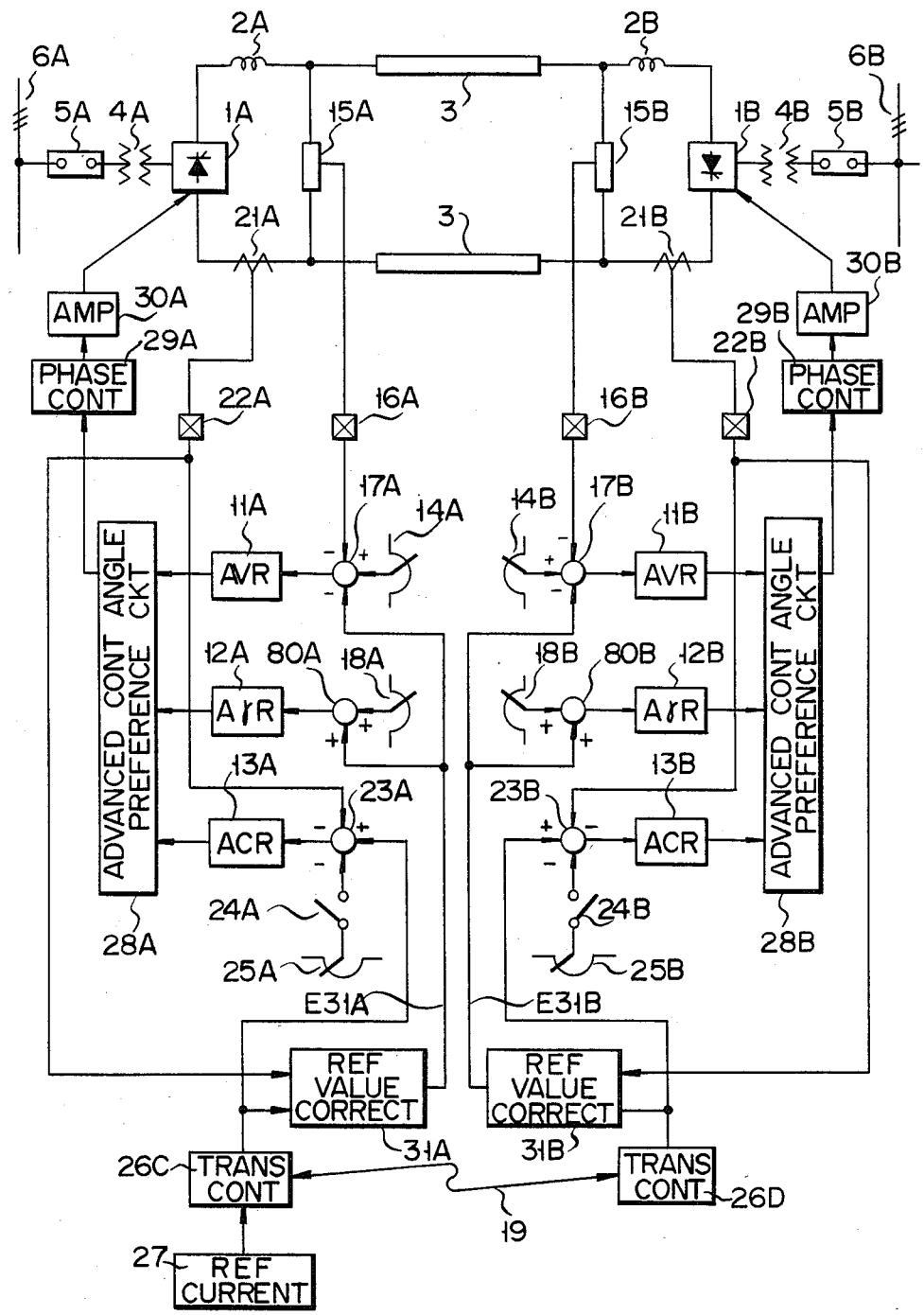
FIG. 9 shows another modification of the embodiment of FIG. 4.

The configuration of the embodiments of FIGS. 4 and 8 may be combined as shown in FIG. 9. In FIG. 9, reference correction value E31A of converter 1A is supplied to summing circuits 17A and 80A, and reference correction value E31B of converter 1B is supplied to summing circuits 17B and 80B.

In summary, when the DC current at the reverse converter side becomes smaller than the reference current value (E26D) of the reverse converter (1B) by a value in excess of a predetermined value (E35), the reference voltage value (E17B) for the automatic voltage regulator (11B) is decreased (FIG. 4 embodiment). Alternatively, the reference extinction angle value (E80B) for the extinction angle regulator (12B) may be increased so as to decrease the DC voltage at the reverse converter side (FIG. 8 embodiment). In addition, the decreased value of the DC voltage is limited to a certain extent by the operation of limiter 34 (FIG. 5). With this configuration, even if the AC voltage of the forward converter is decreased, stable power transfer can be effected.

In a prior art converter control system, transmission control circuits must have a function for always maintaining a certain current margin. On the contrary, a converter control system of the present invention need not have such a current margin maintaining function. In addition, in a prior art converter control system, if the communication system fails, the power transfer amount cannot be changed. On the contrary, even if the communication system fails, the control system of the present invention allows a proper change of the power transfer amount.

What is claimed is:

1. A converter control system comprising:
   first converter means for converting AC electric energy from a first AC power line into converted DC electric energy, said first converter means being located at a first given place;
   DC power transmission means for transmitting the converted DC electric energy from said first converter means to a second given place which is different from said first place, and providing transmitted DC electric energy at said second given place;
   second converter means located at said second given place, for converting the transmitted DC electric energy from said DC power transmission means into converted AC electric energy, and supplying the converted AC electric energy to a second AC power line;
   current regulator means for actuating said first converter means to determine the amount of a DC rated current flowing through said first converter means;
   voltage controller means for actuating said second converter means to determine the voltage of said transmitted DC electric energy; and
   voltage correction means for actuating said voltage controller means to provide a voltage change portion in the voltage of said transmitted DC electric energy, so that the voltage of said transmitted DC electric energy is decreased by said voltage change portion when a DC current flowing through said second converter means is decreased.

2. A converter control system according to claim 1, wherein said voltage correction means includes:
   means for determining the decreased amount of the voltage of said transmitted DC electric energy by said voltage change portion, so that the decreased voltage of said transmitted DC electric energy is fixed to a prescribed value.

3. A converter control system according to claim 1, further comprising:
   detector means coupled to said second converter means, for detecting a DC current flowing through said second converter means and providing a DC current detected value corresponding to the amount of said DC current; and
   reference current means for generating a reference current value,
   wherein said voltage correction means includes:
   difference means coupled to said detector means and said reference current means, for providing a difference value corresponding to the difference between said DC current detected value and said reference current value; and
   limiter means coupled to said difference means, for supplying said voltage controller means with a reference correction value which corresponds to said difference value and is limited within a prescribed range, so that the voltage of said transmitted DC electric energy is changed by said voltage change portion according to the limited prescribed range of said reference correction value.

4. A converter control system according to claim 3, wherein said voltage correction means further includes:
   bias means coupled to said difference means for biasing said difference value so that said reference correction value tends to one side of said limited prescribed range.

5. A converter control system according to any one of claims 1 to 4, wherein said voltage controller means includes:

voltage regulator means for defining, according to a reference voltage value, a constant voltage portion in the voltage of said transmitted DC electric energy, and wherein said voltage correction means functions such that, when a DC current flowing through said second converter means becomes smaller than said rated DC current by a value being in excess of a predetermined value, said reference voltage value is decreased and the decreased amount of said reference voltage value is limited to a certain extent.

6. A converter control system according to any one of claims 1 to 4, wherein said voltage controller means includes:

extinction angle regulator means for defining, according to a reference extinction angle value, a voltage decay portion of the voltage of said transmitted DC electric energy.

and wherein said voltage correction means functions such that, when a DC current flowing through said second converter means becomes smaller than said rated DC current by a value being in excess of a predetermined value, said reference extinction angle value is increased and the increased amount of said reference extinction angle value is limited to a certain extent.

7. A converter control system according to any one of claims 1 to 4, wherein each of said first and second converter means is operated as either one of a rectifier and an inverter, said converter control system further comprising:

second current regulator means for actuating said second converter means to determine the amount of a DC rated current flowing through said second converter means when said first converter means is operated as the inverter while said second converter means is operated as the rectifier.

8. A converter control system according to claim 7, wherein said converter control system further comprises:

second voltage controller means for actuating said first converter means to determine the voltage of DC electric energy transmitted from said second converter means to said first converter means when said first converter means is operated as an inverter while said second converter means is operated as a rectifier.

* * * * *